US 6,627,726 B1

United States Patent
Bruchmann et al.

(10) Patent No.: US 6,627,726 B1
(45) Date of Patent: Sep. 30, 2003

(54) COMPOSITIONS CONTAINING HIGHLY VISCOUS POLYISOCYANATES

(75) Inventors: Bernd Bruchmann, Freinsheim (DE); Günter Mohrhardt, Speyer (DE); Hans Renz, Meckenheim (DE); Ulrich Poth, Münster (DE); Hubert Baumgart, Münster (DE); Simone Bitter, Senden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/720,784

(22) PCT Filed: Jun. 24, 1999

(86) PCT No.: PCT/EP99/04402

§ 371 (c)(1),
(2), (4) Date: Dec. 29, 2000

(87) PCT Pub. No.: WO00/00532

PCT Pub. Date: Jan. 6, 2000

(30) Foreign Application Priority Data

Jun. 29, 1998 (DE) .......................... 198 28 935

(51) Int. Cl.[7] .................. C08G 18/28; C08G 18/42; C08G 18/62; C08G 18/79; C09D 175/00
(52) U.S. Cl. .................. 528/73; 525/123; 525/440; 528/80
(58) Field of Search .................. 528/73, 80; 525/123, 525/440

(56) References Cited

U.S. PATENT DOCUMENTS

| 4,485,226 A | * 11/1984 | Noll et al. ................ 528/45 |
| 4,550,148 A | 10/1985 | Droescher et al. ......... 525/440 |
| 5,214,086 A | 5/1993 | Mormile et al. ........... 524/237 |
| 5,508,372 A | 4/1996 | Brahm et al. .............. 528/80 |
| 5,817,732 A | * 10/1998 | Asahina et al. ........... 528/45 |

FOREIGN PATENT DOCUMENTS

| EP | 0 151 707 | 8/1985 |
| EP | 0 531 249 | 3/1993 |
| EP | 0 566 954 | 10/1993 |

OTHER PUBLICATIONS

DIN 53019, Part 1, Determination of Viscosities and Flow Curves Using Standard Design Rotary Viscometers with a Standard Geometry Measuring System, May 1980.

* cited by examiner

*Primary Examiner*—Rabon Sergent
(74) *Attorney, Agent, or Firm*—Oblon, Spivak, McClelland, Maier & Neustadt, P.C.

(57) ABSTRACT

The invention provides a composition for producing surface coatings combining improved hardness, scratch resistance and acid resistance with good reflow behavior, a process for preparing such a surface coating, and for the use of polyisocyanatoisocyanurates having a functionality of more than 3.5 and a viscosity at 23° C. of more than 3500 to produce surface coatings.

9 Claims, No Drawings

COMPOSITIONS CONTAINING HIGHLY VISCOUS POLYISOCYANATES

The invention relates to a composition comprising at least one isocyanate which is essentially free from allophanate groups and has an average functionality or more than 3.5 and a viscosity of from 4000 to 50000 mPas at from 20° C. to 50° C. and at least one compound having more than at least 5 functional groups which are reactive toward isocyanates with formation of urea or urethane and leading to polyurethanes combining improved hardness, scratch resistance and acid resistance with good reflow behavior. The invention further relates to a process for preparing such a composition and to the use of certain polyisocyanatoisocyanurates for preparing such compositions.

With polyurethane coating materials, especially those intended for use in the automotive or furniture sectors, particular value is generally placed on the resistance of such coatings to different environmental influences. Examples of criteria frequently employed to evaluate such coatings are their hardness, the scratch and acid resistance, and also the reflow behavior.

The reflow behavior is the ability of a cured surface coating (finish) to compensate for relatively small damage sites (in the μm range) which have come about by scratching or impact on the finish by cold flow of the finish into the damage site.

To improve the scratch resistance, use has frequently been made in the past of oligomeric polyisocyanatoisocyanurates based on hexamethylene diisocyanate (HDI) as the isocyanate component. The polyurethane finishes produced therefrom are generally soft and therefore possess good reflow behavior. A disadvantage of such finishes, however, is their inadequate acid resistance.

Hard and acid resistant polyurethane finishes are generally obtained when the polyisocyanate component used comprises, for example, IPDI or the oligomeric polyisocyanatoisocyanurates of IPDI. However, the scratch resistance and reflow behavior or such products is generally inadequate. A further disadvantage of the IPDI based products in respect of a large scale use for the production of mass products is their high price in comparison to that of HDI.

It is an object of the present invention to provide a composition which can be used as a polyurethane coating material and which, after curing, gives surface coatings combining good hardness, scratch resistance and acid resistance with good reflow behavior.

CA-A 2,163 591 relates to polyisocyanate mixtures containing allophanate and isocyanurate groups. Such isocyanate compounds are prepared, for example, by adding a certain amount of a monoalcohol having a molecular weight of up to about 2500 g/mol to a suitable amount of hexamethylene diisocyanate. Subsequent heat treatment of such a mixture produces the corresponding polyisocyanates containing allophanate groups. The reaction with monoalcohols, however, leads to polyisocyanates whose isocyanate group content per molecule (based on the molecular weight) is lower than the isocyanate group content of polyisocyanates prepared without adding monoalcohols. Owing to this reduced number of isocyanate groups per molecule, the functionality required for network formation is reduced, resulting in a lower network density with reductions in the desired properties. Moreover, the document gives no information on the reflow behavior of surface coatings produced with isocyanates containing allophanate groups, nor their acid resistance.

U.S. Pat. No. 4,419,513 relates to mixed isocyanurates obtainable by mixed trimerization of HDI and IPDI. It is stated that the mixed trimers described have desirable properties in respect of hardness and elasticity. A disadvantageous effect with these mixed trimers is that, owing to the IPDI fraction, the isocyanate group content (based on the molecular weight) is lower than in the case of straight HDI trimers, which brings economic disadvantages.

U.S. Pat. No. 4,454,317 mentions polyisocyanatoisocyanurates obtainable, for example, by trimerizing HDI. Described by way of example is an HDI trimer having an NCO content of 20.8% and a viscosity of 14 Pas at room temperature. The document says nothing about the possibility of preparing polyurethanes having improved chemical resistance by combining such polyisocyanatoisocyanurates with appropriate polyols.

EP-A 0 646 608 relates to polyisocyanates obtainable by cyclic trimerization of at least one aliphatic or alicyclic diisocyanate either following its reaction with a polyfunctional alcohol or by trimerization in the presence of such an alcohol. Although such isocyanates have high viscosities, the fraction of polyfunctional alcohol in the polyisocyanate molecule prepared produces a fall in the weight fraction of isocyanate groups per molecule. When the polyisocyanate is used, this necessitates the employment of a larger amount of isocyanate, which is economically undesirable.

U.S. Pat. No. 4,801,675 relates to polyisocyanatoisocyanurates having an isocyanate content of from 10 to 30% by weight and to their reaction with polyols which have an average functionality of from 1.8 to 5.

As stated, it is an object of the present invention to provide a composition which possesses excellent hardness, scratch resistance and acid resistance in conjunction with good reflow behavior.

We have found that this object is achieved by a composition which comprises at least one polyisocyanatoisocyanurate which is essentially free from allophanate groups and has an average NCO functionality of more than 3.5 and a viscosity of more than 4000 mPas up to 50000 mPas at from 20° C. to 50° C. and at least one compound having on average more than 5 functional groups which are reactive toward isocyanates with formation of urea or urethane and which leads to surface coatings which possess excellent hardness, scratch resistance and especially acid resistance coupled with good reflow behavior.

The invention accordingly provides a composition comprising components A and B, comprising a) as component A at least one polyisocyanatoisocyanurate which is essentially free from allophanate groups and has an average NCO functionality of more than 3.5 and a viscosity of more than 4000 mPas up to 50000 mPas at from 20° C. to 50° C., measured with a rotational viscometer in accordance with DIN 53019, and b) as component B at least one compound containing on average more than 5 functional groups which are reactive toward isocyanates with formation of urea, urethane, thiourethane or amide.

The term "essentially free from allophanate groups" refers to compounds whose fraction of allophanate groups is less than 10% in relation to isocyanurate groups.

A polyisocyanatoisocyanurate is a compound possessing at least one isocyanurate ring and at least 2, preferably at least 3, isocyanate groups. The number of isocyanurate rings and the NCO functionality are always calculated as an average of the overall mixture of compounds used as component A. Since the trimerization of diisocyanates generally leads not to pure products but rather to compounds having different degrees of oligomerization, the functionality of the resulting compounds can only be stated as an average value.

It is known that isocyanates may be converted into isocyanurates with the aid of catalysts.

The literature describes numerous catalysts for the cyclization of isocyanates to isocyanurates. Examples of such catalysts are strong bases such as quaternary ammonium hydroxides, e.g., benzyltrimethylammonium hydroxide, alkali metal hydroxides, e.g., sodium or potassium hydroxide, alkali metal alkoxides, e.g., sodium methoxide or potassium isopropoxide, trialkylphosphines, e.g., triethylphosphine, alkylaminoalkylphenols, e.g., 2,4,6-tris (dimethylaminomethyl)phenol, 3- or 4-substituted pyridines or mixtures thereof, e.g., 3- or 4-methylpyridine, organometallic salts, e.g., tetrakis(hydroxyethyl)sodium borate, Friedel-Crafts catalysts, e.g., aluminum chloride, iron(III) chloride, boron trifluoride and zinc chloride, and alkali metal salts of weak organic acids and nitrophenoxides, e.g., potassium octoate, potassium 2-ethylhexoate, potassium benzoate, sodium picrate and potassium phthalimide. Likewise suitable are the quaternary N-(hydroxyalkyl) ammonium salts of organic acids, as described, for example, in U.S. Pat. No. 4,454,317.

In order to polymerize organic polyisocyanates to polymerization products having an isocyanurate structure and free NCO groups it is necessary to terminate the formation of isocyanurate after the desired degree of polymerization has been reached. This is generally achieved by decomposing or neutralizing the catalysts. If, for example, a basic catalyst is used, the reaction may be terminated by adding an amount of an acid, e.g., p-toluenesulfonic acid, or an acid chloride, e.g., benzoyl chloride, which is at least equivalent to the amount of catalyst. If a heat sensitive catalyst is used, a quaternary ammonium hydroxide, for example, the reaction may be interrupted without adding a catalyst poison by heating the reaction mixture to a temperature at which the catalyst is destroyed. A further possibility is to use a catalyst which has been applied to a support material. Following the reaction, such a catalyst may be removed from the reaction mixture by customary solid/liquid separation methods: for example, by filtration or centrifugation.

Examples of suitable quaternary ammonium hydroxides are tetramethyl-, tetraethyl-, trimethylstearyl-, dimethyl-, ethyl- or cyclohexylammonium hydroxide; N,N,N-trimethyl-N-(2-hydroxyethyl)-,N,N,N-trimethyl-N-(2-hydroxypropyl)-, N,N,N-trimethyl-N-(2-hydroxybutyl)-, N,N-dimethyl-N-dodecyl-N-(2-hydroxyethyl)- or N-(2-hydroxyethyl)-N,N-dimethyl-N-(2,2-di-hydroxymethyl-butyl)ammonium hydroxide; N-methyl-2-hydroxyethylmorpholinium hydroxide; N-methyl-N-(2-hydroxypropyl)pyrrolidinium hydroxide; N-dodecyltris-N-(2-hydroxyethyl)ammonium hydroxide; tetra(2-hydroxyethyl)ammonium hydroxide; and the salts of the above-mentioned ammonium ions with anions other than the stated OH⁻ ions, and also mixtures of two or more of the abovementioned compounds. Suitable counterions include, for example, the anions of organic carboxylic acids having 1 to about 20 carbon atoms. Examples of these are the anions of formic, acetic, propanoic, butanoic, pentanoic, hexanoic, heptanoic, caproic, caprylic, capric, lauric, myristic, palmitic or stearic acid. In one preferred embodiment of the present invention, the anion of 2-ethylhexanoic acid is used as the counterion.

The trimerization catalysts are generally used in an amount of from 0.0001 to about 5% by weight, in particular from about 0.001 to about 2% by weight, based on the diisocyanates used. In one preferred embodiment, the catalysts may be used, for example, in an amount of from about 0.005 to about 1.5, in particular in an amount of from about 0.01 to about 1% by weight.

As isocyanates it is possible in principle to use all diisocyanates whose trimerization leads to products which have the properties, in terms of functionality and viscosity, that are required in accordance with the invention. Such isocyanates comprise, in particular, 1,2-ethylene diisocyanate, 1,4-tetramethylene diisocyanate, 1,6-hexamethylene diisocyanate (HDI), 2,2,4- or 2,4,4-trimethyl-1,6-hexamethylene diisocyanate (TMHDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,3- and 1,4-diisocyanatomethylcyclohexane, 2,4- and 2,6-hexahydrotolylene diisocyanate, perhydro-2,2'-, -2,4'- and -4,4'-diphenylmethane diisocyanate, 4,4'-diisocyanato-3,3', 5,5'-tetramethyldicyclohexylmethane or ω,ω'-diisocyanato-1,4-diethylbenzene.

Preference, however, is given to the use of linear or branched aliphatic or cycloaliphatic diisocyanates, especially linear aliphatic diisocyanates. Particular preference is given to a polyisocyanatoisocyanurate as obtainable by trimerizing HDI.

The isocyanate compounds which may be used as component A preferably have a functionality of from 4.0 to 7.0, in particular from 4.2 to 6.5.

To prepare the polyisocyanatoisocyanurates which may be used as component A, an appropriate catalyst is added to the abovementioned diisocyanates or mixtures of two or more of the abovementioned diisocyanates at from about 0° C. to about 150° C. Subsequently, they may be reacted at these temperatures, preferably at from 10° C. to 100° C., in particular from about 20° C. to about 80° C., until the desired NCO number is reached. The reaction time required is normally from about 0.1 to about 16 hours, for example, from about 0.25 to about 4 hours. The reaction may be conducted in the absence or in the presence of organic solvents. Suitable solvents are solvents which are inert toward isocyanates. Examples of these are methylene chloride, chloroform, chlorobenzene, acetone, methyl ethyl ketone, ethyl acetate, butyl acetate, tetrahydrofuran, dioxane, toluene or xylene or mixtures of two or more thereof. On reaching the desired NCO number, the reaction is terminated by a catalyst deactivating additive or by otherwise deactivating the catalyst: by heating, for example.

Suitable deactivators (catalyst poison) include strong acids or carbonyl halides. In this context mention may be made, for example, of acids such as phosphoric acid, hydrochloric acid or p-toluenesulfonic acid and of carbonyl halides such as acetyl chloride, benzoyl chloride or toluenesulfonyl chloride, or mixtures of two or more thereof. In general, the reaction is effectively ended by adding from about 1 to about 20 acid or acid halide equivalents per equivalent of catalyst.

Following the termination of the reaction, the unreacted monomeric diisocyanates and, if appropriate, the solvents are normally removed under gentle conditions. This may be achieved, for example, by means of vacuum distillation in appropriate evaporators or by means of extraction with appropriate solvents in which only the monomeric diisocyanates, but not the trimeric or polymeric polyisocyanates or mixtures thereof, are soluble: for example, using aliphatic or cycloaliphatic hydrocarbons.

The residual monomer content of the polyisocyanatopolyisocyanurates used as component A is preferably less than about 2% by weight, in particular less than about 1% by weight. In one particularly preferred embodiment of the present invention, the polyisocyanatopolyisocyanurates used as component A have a residual monomer content of less than about 0.5% by weight.

As component B, the compositions of the invention comprise at least one compound having on average more than 5 functional groups which are reactive toward isocyanates with formation of urea or urethane. The average amount of functional groups which are reactive toward isocyanates with formation of urea or urethane is based on the entirety of the compounds used as component B.

Accordingly, component B may, for example, consist exclusively of compounds of which each individual molecule has the required functionality. It is also possible as component B, however, to use a mixture of compounds comprising compounds or a mixture of two or more compounds whose molecules contain less than 5 groups which are reactive toward isocyanates with formation of urea or urethane. All that is necessary in such a case is to ensure that the entirety of the compounds present in component B complies with the required average functionality.

Accordingly, component B may also comprise compounds having a functionality with respect to isocyanates of two, three, four or five. Examples of compounds regarded as functional with respect to isocyanates are those having functional groups selected from the group consisting of —OH, —SH, —R—NH or —COOH or a mixture of two or more thereof, R being hydrogen or a linear or branched, saturated or unsaturated alkyl radical having 1 to about 12 carbon atoms or a linear or branched, saturated or unsaturated cycloalkyl radical having 3 to about 12 carbon atoms.

In one preferred embodiment of the invention, component B comprises compounds whose functional groups are R—NH or OH groups or both, R being as defined above. It is particularly preferred, however, if the compounds used as component B have OH groups as their isocyanate reactive functional groups. In the text below, such compounds are referred to as polyols.

In one preferred embodiment of the invention, polyols are used as component B which have a molecular weight ($M_n$) of from about 62 to about 500000, in particular from about 300 to about 40000, and with particular preference from about 1000 to about 25000 g/mol.

Examples of compounds of low molecular mass are ethylene glycol, propylene glycol, butylene glycol, propanediol, pentanediol, hexanediol, heptanediol, octanediol and the higher homologs thereof, glycerol, trimethylolpropane, triethylolpropane, pentaerythritol, pentoses or hexoses such as glucose or sorbitol and also oligosaccharides or polysaccharides such as sucrose or maltose, or mixtures of two or more of said compounds.

Also suitable for use in component B are reaction products of the abovementioned compounds with themselves or reaction products of a mixture of two or more of the abovementioned compounds, for example, polyethylene glycol or polypropylene glycol having a degree of polymerization of from two to about 1000. Likewise suitable are the reaction products of the abovementioned compounds with an alkylene oxide having two to about 10 carbon atoms or with a mixture of two or more such alkylene oxides, for example, with ethylene oxide, propylene oxide or butylene oxide or with a mixture of two or more thereof.

Further compounds suitable and necessary for use in component B are compounds having at least on average 5 or more functional groups from the group consisting of —OH, —SH, —R—NH or —COOH or a mixture of two or more thereof. R is as defined above. The compounds which may be used in component B preferably comprise compounds having at least predominantly OH groups as functional groups which are reactive toward isocyanates.

Suitable in the context of the present invention for use as component B, for example, are polyols based on acrylic or methacrylic acid. Such (meth)acrylate polyols comprise, for example, those polyols obtainable by copolymerizing polymerizable (meth)acrylic monomers having one or more isocyanate reactive hydrogen atoms in one molecule. Examples of such (meth)acrylic monomers having one or more isocyanate reactive hydrogen atoms are 2-hydroxyethyl(meth)acrylate, 2-hydroxydiethyl(meth)acrylate, 2-hydroxypropyl(meth)acrylate, or 2-hydroxybutyl(meth)acrylate. Also suitable are (meth)acrylic esters having two or more isocyanate reactive groups, as obtainable by reacting (meth)acrylic acid with a substoichiometric amount of compounds having two or more isocyanate reactive groups. Examples of these are the (meth)acrylic monoesters or diesters of glycerol, trimethylolpropane, triethylolpropane or pentaerythritol, of saccharides such as glucose, mannitol or sorbitol, or of oligosaccharides or polysaccharides such as sucrose or maltose, and also mixtures of two or more of said compounds.

Examples of suitable comonomers are methyl(meth)acrylate, isopropyl(meth)acrylate, n-butyl(meth)acrylate, 2-ethylhexyl(meth)acrylate, isobutyl(meth)acrylate, n-hexyl(meth)acrylate, cyclohexyl(meth)acrylate, lauryl(meth)acrylate or glycidyl(meth)acrylate.

If desired, further monomers may be present at the polymerization, examples being unsaturated carboxylic acids such as acrylic acid, methacrylic acid, maleic acid or itaconic acid or unsaturated amides such as acrylamide, N-methylolacrylamide or diacetoneacrylamide, styrene, vinyltoluene, vinyl acetate or acrylonitrile, or mixtures of two or more of said compounds.

The polymers are prepared by conventional methods of polymer chemistry; for example, by peroxide initiated solution polymerization, emulsion polymerization or suspension polymerization.

In one preferred embodiment of the invention, component B comprises a polyester, polyacrylate, polymethacrylate, or a mixture of two or more thereof.

Likewise possible for use as component B are polyetherpolyamines or polyols selected from the group consisting of polyether polyols, polyester polyols, polythioether polyols, polyesteramides, OH-containing polyacetals and OH-containing aliphatic polycarbonates, or mixtures of two or more of said polyols. The hydroxyl number of the polyhydroxy compounds in this case is generally from 15 to 850 mg KOH/g and preferably from 20 to 600 mg KOH/g.

Suitable polyester polyols, for example, may be prepared from organic dicarboxylic acids having 2 to 12 carbon atoms, preferably from aliphatic dicarboxylic acids having 4 to 6 carbon atoms, and polyhydric alcohols having 2 to 12 carbon atoms. Examples of suitable dicarboxylic acids are succinic, glutaric, adipic, suberic, azelaic, sebacic, decanedicarboxylic, maleic, fumaric, phthalic, isophthalic or terephthalic acid or mixtures of two or more thereof. The dicarboxylic acids may also be used in the form of the corresponding dicarboxylic acid derivatives, e.g., as dicarboxylic esters of alcohols having 1 to 4 carbon atoms or as dicarboxylic anhydrides.

It is preferred to use mixtures of dicarboxylic acids comprising succinic, glutaric and adipic acid in proportions of, for example, from 20 to 35:35 to 50:20 to 32 parts by weight, and especially adipic acid. Examples of polyhydric alcohols are ethanediol, diethylene glycol, 1,2- and 1,3- propanediol, dipropylene glycol, 1,4-butanediol, 1,5-pentanediol, 1,6-hexanediol, 1,10-decanediol, glycerol and trimethylolpropane. A further possibility is to use polyester polyols from lactones, e.g., from ε-caprolactone, or from hydroxycarboxylic acids, e.g., from ω-hydroxycaproic acid.

To prepare the polyester polyols which may be used as a constituent of component B, the organic polycarboxylic acids or their derivatives or mixtures comprising both may be polycondensed together with the polyhydric alcohols, without catalyst or, preferably, in the presence of esterification catalysts. This judiciously takes place in an atmosphere of inert gas, e.g., nitrogen, helium or argon. The polycondensation takes place, for example, in the melt at temperatures from about 150 to about 250° C., preferably from about 180 to about 220° C., operating under reduced pressure if desired. The reaction is continued until the desired acid number is obtained, which is advantageously less than 10, preferably less than 2.

At the abovementioned temperatures, the polycondensation may be conducted, for example, to an acid number of from about 80 to about 30 under atmospheric pressure and subsequently under a pressure of less than 500 mbar, for example, from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation may also be conducted in liquid phase in the presence of diluents and/or entrainers, e.g., benzene, toluene, xylene or chlorobenzene.

To prepare the polyester polyols which may be used as component B, the organic polycarboxylic acids and/or acid derivatives and polyhydric alcohols are polycondensed advantageously in a molar ratio of from about 1:1 to about 1:8, preferably from about 1:1.5 to about 1:2.

The polyester polyols obtained possess, for example, a molecular weight ($M_n$) of from 480 to 10000, preferably from 600 to 5000, and in particular from 600 to 3000.

Likewise possible for use as polyols are polyether polyols, which may be prepared by known processes: for example, by anionic polymerization of cyclic ethers with alkali metal hydroxides such as sodium or potassium hydroxide or with alkali metal alkoxides, e.g., sodium methoxide, sodium or potassium ethoxide or potassium isopropoxide, as catalysts and with the addition of at least one starter molecule containing, for example, from about 2 to about 8 reactive hydrogen atoms. Likewise possible for use are polyether polyols prepared by cationic polymerization of cyclic ethers with Lewis acids such as antimony pentachloride, boron trifluoride etherate etc. or bleaching earth as catalysts.

Examples of suitable cyclic ethers are tetrahydrofuran, 1,3-propylene oxide, 1,2- and 2,3-butylene oxide, styrene oxide, ethylene oxide or 1,2-propylene oxide or mixtures of two or more thereof. Examples of suitable starter molecules are water, organic dicarboxylic acids such as succinic acid, adipic acid, phthalic acid or terephthalic acid, and also aliphatic and aromatic, optionally N-monoalkyl-, N,N- and N,N'-dialkyl-substituted diamines having 1 to 20 carbon atoms in the alkyl radical. Suitable compounds from the last-mentioned class are, for example, optionally monoalkyl- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine or 4,4'-, 2,4'- and 2,2'-diaminodiphenylmethane.

Further suitable starter molecules include alkanolamines, e.g., ethanolamine, N-methyl- and N-ethyl-ethanolamine, dialkanolamines such as diethanolamine, N-methyl- and N-ethyl-diethanolamine and trialkanolamines, e.g., triethanolamine, and also ammonia. As starter molecules it is preferred to use polyhydric alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

Further polyether polyols suitable for use in component B in accordance with the invention are polymer modified polyether polyols, preferably graft polyether polyols, especially those based on styrene or acrylonitrile and prepared by in situ polymerization of acrylonitrile, styrene or, preferably, from mixtures of styrene and acrylonitrile in a weight ratio, for example, of from 90:10 to 10:90, in the abovementioned polyether polyols in accordance with the details of the German Patents 11 394, 12 22 699 (U.S. Pat. Nos. 3,304, 273, 3,383,351, 3,523,093), 11 52 536 (GB 10 40 452) and 11 52 537 (GB 987 618).

Like the polyester polyols, the polyether polyols may be used individually or as mixtures. Furthermore, they may be mixed with the graft polyether polyols or polyester polyols and also OH-containing polyesteramides, polyacetals, polycarbonates and/or polyether-polyamines.

Suitable OH-containing polyacetals include, for example, the compounds preparable from glycols, such as diethylene glycol, triethylene glycol, 4,4'-dihydroxyethoxydiphenyldimethylmethane, hexanediol, and formaldehyde. Suitable polyacetals may also be prepared by polymerizing cyclic acetals.

Suitable OH-containing polycarbonates are those preparable, for example, by reacting polyfunctional alcohols such as 1,3-propanediol, 1,4-butanediol or 1,6-hexanediol, diethylene glycol, triethylene glycol, tetraethylene glycol, glycerol, trimethylolpropane, triethylolpropane, pentaerythritol, oligo- or polyglycerol, oligo- or polysaccharides with diaryl carbonates, e.g., diphenyl carbonate, or phosgene.

The polyesteramides include, for example, the predominantly linear condensates obtained from polyfunctional, saturated and/or unsaturated carboxylic acids and/or their anhydrides and from polyfunctional saturated and/or unsaturated amino alcohols or mixtures of polyfunctional alcohols and amino alcohols and/or polyamines.

Suitable polyetherpolyamines may be prepared by known methods from the abovementioned polyether polyols. By way of example, mention may be made of the cyanoalkylation of polyoxyalkylene polyols and subsequent hydrogenation of the resultant nitrile (e.g., U.S. Pat. No. 3,267,050) or the partial or complete amination of polyoxyalkylene polyols with amines or ammonia in the presence of hydrogen and catalysts (e.g., DE 12 15 373).

In one preferred embodiment of the invention, the polyurethanes are prepared using, at least in part, polyols whose average number of OH groups per molecule is four or more. In a further preferred embodiment, the average functionality of component B is more than 10.

In one preferred embodiment of the invention, the viscosity of component A at 23° C. is more than about 8000 mPas.

Besides components A and B, the composition of the invention may comprise further additives. These include, for example, further polymeric compounds such as melamine resins, examples being hexamethoxymethylolmelamine, methylated or butylated melamines or mixtures thereof.

Furthermore, the compositions of the invention may also comprise solvents and additives.

Examples of suitable solvents are toluene, xylene, cyclohexane, mineral oils or naphtha, ketones such as acetone, methyl ethyl ketone or methyl isobutyl ketone, esters such as ethyl acetate, n-butyl acetate or Cellosolve acetate, or mixtures of two or more of said solvents.

As additives it is possible for accelerators to be present if desired. The accelerators include, for example, organometallic compounds, such as the organometallic compounds of tin, zinc or lead. Further additives which may be present are antioxidants. These include, for example, sterically hindered phenols, UV absorbers such as benzotriazoles or benzophenones.

Moreover, dyes or pigments may be present as additives. These include, for example, titanium dioxide, carbon black, indigo, quinacridones, talc or metallic powder pigments such as aluminum.

Additionally, the compositions of the invention may comprise rheological additives such as hydroxymethylcellulose, hydroxyethylcellulose or urea compounds or a mixture thereof.

The compositions of the invention contain component A in an amount of from about 5 to about 95% by weight, based on the overall composition. Component B is present in the compositions of the invention in an amount of from about 95 to about 5% by weight.

The ratio of NCO groups of component A to OH groups of component B is preferably from about 0.6 to 1.4, in particular from about 0.9 to about 1.1.

Solvents or other additives may be present overall in an amount of up to about 80% by weight, preferably from about 0 to about 70% by weight.

The invention likewise provides for the use of at least one polyisocyanatoisocyanurate which is essentially free from allophanate groups and has an average NCO functionality of more than 3.5 and a viscosity of from 4000 mPas up to 50000 mPas at from 20° C. to 50° C., measured with a rotational viscometer in accordance with DIN 53019, to prepare surface coatings having a pendulum hardness of at least 80 s, measured by the König method.

In one preferred embodiment of the use according to the invention, the polyisocyanatoisocyanurate has a functionality of from 4.0 to 7.0. Good results may be obtained, for example, if the polyisocyanatoisocyanurate has a viscosity of more than 8000 mPas up to 30000 mPas at from 20° C. to 50° C., measured with a rotational viscometer in accordance with DIN 53019.

In one preferred embodiment, the surface coatings have an improved scratch resistance or an improved acid resistance relative to surface coatings produced with noninventive polyisocyanates. The scratch resistance and the acid resistance are evaluated in accordance with the methods described in this text. Preferably, the acid resistance of the surface coatings in accordance with the acid test described below is at least 25 at 70° C.

The invention is illustrated below by examples.

EXAMPLES

1. Preparation of Component A

Hexamethylene diisocyanate (HDI) was introduced into a reaction vessel under nitrogen blanketing and heated to 80° C. 400 ppm by weight (based on diisocyanate) of the catalyst N,N,N-trimethyl-N-(2-hydroxypropyl)ammonium 2-ethylhexanoate were added, the mixture was reacted at 80° C. and the reaction was stopped when the crude product had the NCO content specified in table 1 by adding 400 ppm by weight (based on diisocyanate) of di-2-ethylhexyl phosphate. Subsequently, to remove monomeric HDI, the reaction mixture was distilled in a thin film evaporator at an oil temperature of 140° C. under reduced pressure (2.5 mbar). The HDI residual monomer content thereafter was below 0.3% by weight.

Data on the end products are given in table 1.

TABLE 1

| Component A, product data | | | | |
|---|---|---|---|---|
| Polyisocyanate No. | NCO content crude product (% by wt.) | NOC content end product (% by wt.) | Visc. 23° C. (mPas) | Average functionality |
| 1 | 37.3 | 21.4 | 4 630 | 4.0 |
| 2 | 34.6 | 20.7 | 8 100 | 4.3 |
| 3 | 34.2 | 20.5 | 9 300 | 4.4 |
| 4 | 32.4 | 20.0 | 14 800 | 4.6 |
| 5 | 32.2 | 19.8 | 16 400 | 4.9 |
| 6 | 30.7 | 19.5 | 23 700 | 5.1 |
| 7 | 29.0 | 18.9 | 2 600 (30° C.) | 5.8 |
| 8 | 27.2 | 18.1 | 21 600 (40° C.) | 6.5 |

2. Preparation of an Acrylate Resin as Component B for a Two-component Clearcoat 525 g of pentyl acetate (isomer mixture) were weighed out into a 4 l stainless steel reactor equipped with oil heating, internal temperature measurement, reflux condenser, stirrer and two feed vessels and heated with constant stirring to 140° C. under nitrogen inert gas blanketing. 162 g of an aromatics fraction having a boiling range from 160 to 174° C. and 225 g of tert-butyl perethylhexanoate were weighed out into the first feed vessel and mixed. 207 g of ethylhexyl acrylate, 462 g of ethylhexyl methacrylate, 360 g of cyclohexyl methacrylate, 858 g of 2-hydroxypropyl methacrylate and 6 g of acrylic acid were weighed out into the second feed vessel and mixed.

The feed stream from feed vessel 1 was commenced at a solvent temperature in the reactor of 140° C. The feed rate was such that, with uniform metering, the mixture from feed vessel 1 ran into the reaction vessel over the course of 4.75 hours. After a further 15 minutes, the feed stream from the second feed vessel was commenced. The feed rate was set so that, with uniform metering, the acrylate mixture took 4.00 hours to enter the reactor. Throughout the metering period, the temperature was held at 140° C. After the end of the feed stream from feed vessel 1, the reaction mixture in the reactor was stirred at 140° C. for two hours. The reaction mixture was subsequently cooled to 80° C. and adjusted with 195 g of pentyl acetate (isomer mixture) to a nonvolatiles content of 65.1% by weight. The solution obtained had an acid number of 6.2 mg KOH/g based on the polymer content, a viscosity of 575 mPas (measured as a 60% strength solution in pentyl acetate using a rotational viscometer in accordance with DIN 53019 at 23° C.) and a molar mass (number average) of 3150 g/mol, determined by means of GPC analysis.

3. Use of Components A and B in 2K Polyurethane Coating Systems 3.1 Stock Coating Material The following constituents were weighed out into a stirred vessel:

72 parts by weight of the acrylate resin solution prepared in example 2 (component B), 0.15 part by weight of a polyether modified polydimethylsiloxane, in solution in 2.85 parts by weight of xylene, 1.5 parts by weight of a substituted hydroxyphenylbenzotriazole with 1.0 part by weight of an N-methyl-2,2,6,6-tetramethylpiperid-4-yl ester, in solution in 5.0 parts by weight of methoxypropyl acetate, 6.0 parts by weight of butoxyethyl acetate, 5.5 parts by weight of an aromatics mixture having a boiling range from 160 to 174° C.

The mixture was homogenized by stirring for 30 minutes.

3.2 Preparation of a Commercially Customary Polyisocyanate Crosslinker (Comparative Example Using a Comparative Component A)

80 parts by weight of a commercially customary polyisocyanurate based on hexamethylene diisocyanate, having an NCO content of 22.3% by weight and a viscosity at 23° C. of 3100 mPas (comparative component A), were dissolved in 10 parts by weight of butyl acetate and 10 parts by weight of an aromatics mixture having a boiling range from 160 to 174° C.

3.3 Preparation of a Polyisocyanate Crosslinker Using the Inventive Component A 80 parts by weight of the inventive polyisocyanurate 3 (table 1) were dissolved in 10 parts by weight of butyl acetate and 10 parts by weight of an aromatics mixture having a boiling range from 160 to 174° C.

3.4 Mixture of Stock Coating Material and Polyisocyanate Crosslinker

A short time before application, the stock coating material from example 3.1 was mixed firstly in a ratio of 100:30 parts by weight with the solution of a polyisocyanate crosslinker from example 3.2 and also in a ratio of 100:33 parts by weight with the inventive polyisocyanate crosslinker from example 3.3. The mixtures were adjusted with butyl acetate to an efflux viscosity of 28 seconds in the DIN 53211 efflux cup at 20° C.

4. Application

Steel body panels pretreated with commercially customary zinc phosphate solution and bearing a coat of 20 μm of a commercially customary cationic electrodeposition coating material and, atop that, a coat of 35 μm of a commercially customary aqueous surfacer were coated by means of a pneumatic spray apparatus with an anthracite colored aqueous metallic basecoat to give a dry film thickness of 14 μm. Following the application of the basecoat, the system was dried initially at 80° C. for 10 minutes. Then the two coating mixtures from example 3.4 were each applied by means of a pneumatic spray apparatus to the initially dried basecoat, to give a dry film thickness of from 40 to 43 μm. The coats were flashed off at room temperature for 5 minutes. The panels were then treated in a forced air oven at an air temperature of 140° C. for 20 minutes. The panels were cooled to room temperature, stored for two hours and then assessed.

5. Assessment

The measurements for the clearcoat of the invention were compared with those for the comparative example containing the commercially customary crosslinker:

| Test method | Inventive Example | Comparative example |
|---|---|---|
| Gloss (%, Gardner, 20°) | 83 | 83 |
| Pendulum hardness (seconds, König) | 133 | 128 |
| Gloss following condensation test (240 hours 40° C., 98% RAH) | 84 | 81 |
| Blisters after condensation test | m0g0 | m0g0 |
| Adhesion after condensation test | 1.5 | 2.0 |
| Scratch resistance, sand test* (gloss difference, %) | 18.7 | 22.1 |
| Reflow behavior at 40° C. (remaining gloss difference, %) | 18.7 | 17.4 |
| Reflow at 60° C. (remaining gloss difference, %) | 11.6 | 11.6 |

| Test method | Inventive Example | Comparative example |
|---|---|---|
| Chemical resistance (acid test** rating totals) | | |
| 50° C. | 0 | 0 |
| 60° C. | 1 | 1.5 |
| 70° C. | 6.5 | 6.5 |
| 80° C. | 15.5 | 24.5 |

Notes:
m = amount
g = size

*=Sand Test

In the sand test, the finish surface is coated with sand (20 g of quartz silver sand, 1.5–2.0 mm). The sand is placed in a PE beaker (with its base cut off level) which is attached firmly to the test panel. The test panels used are the same as those described above. The panel, with the beaker and sand, is set in shaking movements by means of a motor drive. The movement of the loose sand causes damage to the finish surface (100 double strokes in 22 s). Following sand exposure, the test area is cleaned of abraded material, wiped off carefully under a jet of cold water, and then dried using compressed air. The gloss to DIN 67530 is measured before and after damage.

**=Acid Test

The acid test is used to determine the resistance of finish surfaces to acids, alkalis and water droplets. The coating, after baking, is subjected to further temperature loads in a gradient oven (30 min at 40° C., 50° C., 60° C. and 70° C.). Beforehand, the test substances (1%, 10% and 36% strength sulfuric acid; 6% strength sulfurous acid; 10% strength hydrochloric acid; 5% strength sodium hydroxide solution; DI (deionized) water—1, 2, 3 or 4 drops) are applied in a defined manner using a metering pipette. After the substances have been allowed to act, they are removed under running water and the damage is assessed visually after 24 h in accordance with a predetermined scale:

| Rating | Appearance |
|---|---|
| 0 | no defect |
| 1 | slight marking |
| 2 | marking/dulling/no softening |
| 3 | marking/dulling/color change/softening |
| 4 | cracks/incipient etching |
| 5 | clearcoat removed |

Each individual marking (spot) was evaluated and the result for each coating was noted appropriately (e.g., rating totals for one temperature).

Evaluation

The use of the crosslinker of the invention produced clearcoat surfaces which have a significantly improved acid resistance relative to the prior art in combination with a virtually identical reflow behavior. The scratch resistance was at least comparable to that of the clearcoat produced using the commercially customary crosslinker. At elevated temperatures, however, it far exceeded the scratch resistance of the surface coatings produced in accordance with the prior art.

We claim:

1. A composition, comprising:
   component A: at least one polyisocyanatoisocyanurate which comprises less than 10% allophanate groups in relation to isocyanurate group and has an average NCO functionality of more than 3.5 and a viscosity between 4,000 mPas and 50,000 mPas when the at least one polyisocyanatoisocyanurate is at a temperature ranging from 20° C. to 50° C., measured with a rotational viscometer in accordance with DIN 53019: and component B: at least one compound containing on average more than 10 functional groups which are reactive toward isocyanates to form urea, urethane, thiourethane or amide.

2. A composition as claimed in claim 1, wherein component A has an average functionality of from 4.0 to 7.0.

3. A composition as claimed in claim 1, wherein component B comprises a polyester, polyacrylate, polymethacrylate or a mixture of two or more thereof.

4. A composition as claimed in claim 1, wherein component A has a viscosity at 23° C. of at least 8000 mPas.

5. The composition as claimed in claim 1, wherein component A has an average functionality of from 4.2 to 6.5.

6. A method of preparing surface coatings having a König pendulum hardness of at least 80 s, comprising contacting at least one composition according to claim 1 with a surface.

7. The method as claimed in claim 6, wherein the polyisocyanatoisocyanurate has a functionality of from 4.0 to 7.0.

8. The method according to claim 6, wherein the polyisocyanatoisocyanurate has a visocosity of more than 8,000 mPas up to 30,000 mPas, measured with a viscometer in accordance with DIN 53019 at a temperature of from 20° C. to 50° C.

9. A process for preparing a composition, comprising mixing a) at least one polyisocyanatoisocyanurate whose fraction of allophanate groups is least than 10% in relation to isocyanurate groups and has an average NCO functionality of more than 3.5 and a viscosity of from 4,000 mPas up to 50,000 mPas when the at least one polyisocyanatoisocyanurate is at a temperature ranging from 20° C. to 50° C.; and b) at least one compound containing on average more than 10 functional groups which are reactive toward isocyanates, with formation of urea, urethane, thiourethane or amide.

* * * * *